US012140883B2

(12) United States Patent
Adams et al.

(10) Patent No.: US 12,140,883 B2
(45) Date of Patent: Nov. 12, 2024

(54) TONER CONTAINER HAVING A TONER PORT SHUTTER INTERFACE

(71) Applicant: LEXMARK INTERNATIONAL, INC., Lexington, KY (US)

(72) Inventors: Emily Stefano Adams, Lexington, KY (US); Brian Lester Boettcher, Versailles, KY (US); Brian Lee Hawes, Lexington, KY (US); Brittany Nicole Sexton, Lexington, KY (US); Edward Lynn Triplett, Lexington, KY (US); Glen Alan Reidhaar, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 18/143,938

(22) Filed: May 5, 2023

(65) Prior Publication Data

US 2024/0295839 A1 Sep. 5, 2024

Related U.S. Application Data

(60) Provisional application No. 63/449,643, filed on Mar. 3, 2023.

(51) Int. Cl.
*G03G 15/08* (2006.01)

(52) U.S. Cl.
CPC ..... *G03G 15/0886* (2013.01); *G03G 15/0865* (2013.01)

(58) Field of Classification Search
CPC ....................... G03G 15/0865; G03G 15/0886
USPC ................................................ 399/258, 260
See application file for complete search history.

(56) References Cited

U.S. PATENT DOCUMENTS

| | | | |
|---|---|---|---|
| 5,697,017 | A | 12/1997 | Rooke et al. |
| 7,548,710 | B2 | 6/2009 | Gayne et al. |
| 7,606,520 | B2 | 10/2009 | Dawson |
| 7,668,489 | B2 | 2/2010 | Kim et al. |
| 8,649,710 | B2 | 2/2014 | Buchanan et al. |
| 8,737,887 | B2 | 5/2014 | Cavill et al. |

(Continued)

FOREIGN PATENT DOCUMENTS

| | | | |
|---|---|---|---|
| CN | 107533313 | * | 12/2020 |
| JP | 2013152361 | A | 8/2013 |

OTHER PUBLICATIONS

U.S. Appl. No. 18/143,954, filed May 5, 2023 (Adams et al.).

(Continued)

*Primary Examiner* — Hoan H Tran

(57) ABSTRACT

A toner container for use with a developer unit of an image forming device according to one example embodiment includes a body having a front that leads during insertion of the toner container into the image forming device and a rear that trails during insertion of the toner container into the image forming device. An outlet port is positioned on a bottom of the body and adjacent to the front of the body for exiting toner from the toner container. An engagement surface is positioned at the bottom of the body and adjacent to the front of the body for contacting and pushing open a developer shutter of an inlet port of the developer unit in a direction of insertion of the toner container into the image forming device during insertion of the toner container into the image forming device.

24 Claims, 12 Drawing Sheets

(56) References Cited

U.S. PATENT DOCUMENTS

| | | | | |
|---|---|---|---|---|
| 8,867,966 | B2 | 10/2014 | Acosta et al. | |
| 8,867,968 | B2 | 10/2014 | Buchanan et al. | |
| 8,948,659 | B2 | 2/2015 | Baker et al. | |
| 8,948,660 | B2 | 2/2015 | Baker et al. | |
| 9,104,141 | B2 | 8/2015 | Buchanan et al. | |
| 9,261,851 | B2 | 2/2016 | Leemhuis et al. | |
| 9,323,178 | B2 | 4/2016 | Acosta et al. | |
| 9,436,126 | B1 | 9/2016 | Anderson, Jr. et al. | |
| 9,477,177 | B2 | 10/2016 | Leemhuis et al. | |
| 9,933,727 | B2 | 4/2018 | Reidhaar | |
| 2007/0237551 | A1 | 10/2007 | Kawai | |
| 2009/0214269 | A1 | 8/2009 | Choi et al. | |
| 2010/0166460 | A1 | 7/2010 | Maeshima | |
| 2015/0043944 | A1* | 2/2015 | Yamamoto | G03G 15/0886 399/258 |
| 2017/0097587 | A1 | 4/2017 | Inada | |
| 2017/0343927 | A1 | 11/2017 | Kainuma et al. | |
| 2019/0339633 | A1* | 11/2019 | Yasuda | G03G 15/0886 |
| 2020/0278623 | A1* | 9/2020 | Bayubay | G03G 15/0865 |

OTHER PUBLICATIONS

International Search Report and Written Opinion of the International Searching Authority dated Mar. 28, 2024 for PCT Application No. PCT/US2024/016350.

Machine translation of JP-2013152361-A published Aug. 8, 2013 (Kawai).

Non-Final Office Action dated Apr. 9, 2024 for U.S. Appl. No. 18/143,954 (Adams et al.).

* cited by examiner

TONER CONTAINER HAVING A TONER PORT SHUTTER INTERFACE

CROSS REFERENCES TO RELATED APPLICATIONS

This application claims priority to U.S. Provisional Patent Application Ser. No. 63/449,643, filed Mar. 3, 2023, entitled "Toner Cartridge and Developer Unit Shutter Interface," the content of which is hereby incorporated by reference in its entirety.

BACKGROUND

1. Field of the Disclosure

The present disclosure relates generally to image forming devices and more particularly to a toner container having a toner port shutter interface.

2. Description of the Related Art

During the electrophotographic printing process, an electrically charged rotating photoconductive drum is selectively exposed to a laser beam. The areas of the photoconductive drum exposed to the laser beam are discharged, creating an electrostatic latent image of a page to be printed on the photoconductive drum. Toner particles are then electrostatically picked up by the latent image on the photoconductive drum, creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units having a shorter lifespan than the image forming device. It is important to prevent the unwanted release of toner from these replaceable units. For example, toner may be fed from a reservoir in a first replaceable unit through an outlet port on the first replaceable unit and into an inlet port on a second replaceable unit. The first and second replaceable units may each include a shutter that seals the outlet and inlet ports, respectively, when the first and/or second replaceable unit is not installed in the image forming device. When the first and second replaceable units are operatively positioned in the image forming device, the shutter of each replaceable unit is open in order to permit toner delivery from the outlet port of the first replaceable unit to the inlet port of the second replaceable unit. Toner leakage may be experienced if at least one of the shutters is not accurately positioned relative to its corresponding outlet port or inlet port, for example during insertion of the first and/or second replaceable unit into the image forming device. Leaked toner may cause uncleanliness, which customers disfavor, and, in some instances, contamination of electrophotographic components and print defects. Accordingly, it will be appreciated that prevention of the unwanted release of toner between replaceable units is desired.

SUMMARY

A toner container for use with a developer unit of an image forming device according to one example embodiment includes a body having a top, a bottom, a first side and a second side positioned between a front and a rear of the body. The front of the body leads during insertion of the toner container into the image forming device, and the rear of the body trails during insertion of the toner container into the image forming device. The body has a reservoir for holding toner. An outlet port is positioned on the bottom of the body and adjacent to the front of the body for exiting toner from the toner container. An engagement surface is positioned at the bottom of the body and adjacent to the front of the body for contacting and pushing open a developer shutter of an inlet port of the developer unit in a direction of insertion of the toner container into the image forming device during insertion of the toner container into the image forming device.

Embodiments include those wherein the toner container includes a toner container shutter that is movable between a closed position blocking the outlet port and an open position unblocking the outlet port, and the toner container shutter includes the engagement surface. In some embodiments, the engagement surface projects downward from a bottom surface of the toner container shutter. In some embodiments, the toner container shutter is spring biased towards the closed position and the front of the body. In some embodiments, the outlet port is positioned closer to the front of the body than the engagement surface is to the front of the body when the toner container shutter is in the closed position.

A toner container for use with a developer unit of an image forming device according to another example embodiment includes a body having a top, a bottom, a first side and a second side positioned between a first longitudinal end and a second longitudinal end of the body. The first longitudinal end of the body leads during insertion of the toner container into the image forming device, and the second longitudinal end of the body trails during insertion of the toner container into the image forming device. The body has a reservoir for holding toner. An outlet port is positioned on the bottom of the body and adjacent to the first longitudinal end of the body for exiting toner from the toner container. A drive coupler is positioned on the first longitudinal end of the body for mating with a corresponding drive coupler in the image forming device when the toner container is installed in the image forming device for receiving rotational motion from the corresponding drive coupler in the image forming device. An engagement member projects downward at the bottom of the body and adjacent to the first longitudinal end of the body. A front face of the engagement member that faces toward the first longitudinal end of the body is unobstructed to contact and push open a developer shutter of an inlet port of the developer unit in a direction from the second longitudinal end of the body toward the first longitudinal end of the body during insertion of the toner container into the image forming device.

Embodiments include those wherein the toner container includes a toner container shutter that is movable between a closed position blocking the outlet port and an open position unblocking the outlet port, and the toner container shutter includes the engagement member. In some embodiments, the outlet port is positioned closer to the first longitudinal end of the body than the front face of the engagement member is to the first longitudinal end of the body when the toner container shutter is in the closed position. In some embodiments, the toner container shutter is translatable between the closed position and the open position and spring biased towards the closed position and the first longitudinal end of the body, and the outlet port is positioned closer to the first longitudinal end of the body than the front face of the engagement member is to the first longitudinal end of the body when the toner container shutter is in the closed position.

Embodiments include those wherein the toner container includes an extension protruding from the toner container shutter in a direction from the second longitudinal end of the body toward the first longitudinal end of the body and unobstructed at the first longitudinal end of the body for contacting a corresponding surface in the image forming device during insertion of the toner container into the image forming device and receiving an actuation force from the corresponding surface in the image forming device to move the toner container shutter in a direction from the first longitudinal end of the body toward the second longitudinal end of the body from the closed position to the open position. In some embodiments, the extension has a free end that extends farther than the first longitudinal end of the body in the direction from the second longitudinal end of the body toward the first longitudinal end of the body when the toner container shutter is in the closed position to contact the corresponding surface in the image forming device.

A toner container for use with a developer unit of an image forming device according to another example embodiment includes a body having a reservoir for storing toner, an outlet port for exiting toner from the toner container, and a first shutter positioned at the outlet port. The first shutter is movable between a closed position blocking the outlet port and an open position unblocking the outlet port. A projection downward from the first shutter is movable with the shutter and is positioned to contact and push open a second shutter of an inlet port of the developer unit in an insertion direction of the toner container into the image forming device during insertion of the toner container into the image forming device.

In some embodiments, the projection is positioned closer to the outlet port when the first shutter is in the closed position than when the first shutter is in the open position.

In some embodiments, the first shutter is translatable between the closed position and the open position.

A toner container for use with a developer unit of an image forming device according to another example embodiment includes an elongated body extending along a longitudinal dimension between a front and a rear of the body. The body has a reservoir for storing toner. An outlet port is positioned on a bottom of the body and adjacent to the front of the body for exiting toner from the reservoir. A first shutter is positioned at the outlet port. The first shutter is translatable along the longitudinal dimension between a closed position blocking the outlet port and an open position unblocking the outlet port. The first shutter has an engagement surface that is positioned to contact and push open a second shutter of an inlet port of the developer unit in a rear-to-front direction of the body during insertion of the toner container into the image forming device. A biasing member biases the first shutter in the rear-to-front direction of the body towards the closed position. The biasing member has a biasing force that keeps the first shutter from unblocking the outlet port when the engagement surface of the first shutter receives a reaction force in a front-to-rear direction of the body from contact with the second shutter as the engagement surface pushes open the second shutter in the rear-to-front direction during insertion of the toner container into the image forming device.

A toner container for use in an image forming device according to another example embodiment includes an elongated body extending along a longitudinal dimension of the body between a front and a rear of the body. The front of the body leads during insertion of the toner container into the image forming device, and the rear of the body trails during insertion of the toner container into the image forming device. The body has a reservoir for storing toner and an outlet port for exiting toner from the reservoir. A shutter is positioned at the outlet port. The shutter is translatable between a closed position blocking the outlet port and an open position unblocking the outlet port. An extension protrudes from the shutter along the longitudinal dimension towards the front of the body and unobstructed at the front of the body for contacting a corresponding surface in the image forming device during insertion of the toner container into the image forming device and receiving an actuation force from the corresponding surface in the image forming device to move the shutter along the longitudinal dimension in a front-to-rear direction of the body from the closed position to the open position.

In some embodiments, the extension has a free end that extends farther than a drive coupler on the front of the body in a rear-to-front direction of the body when the shutter is in the closed position to contact the corresponding surface in the image forming device.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
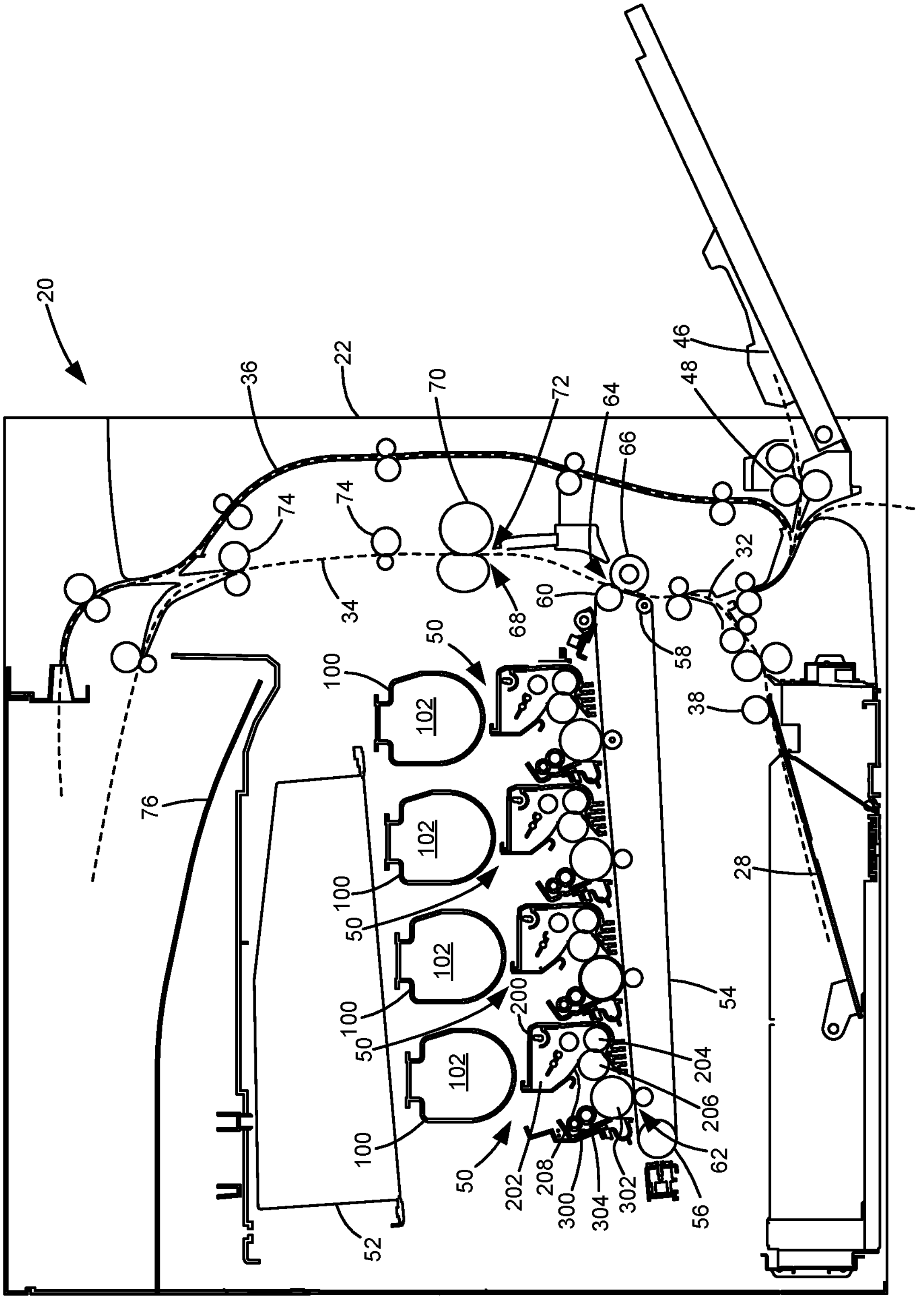
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user is able to enter commands and generally control the operation of image forming device 20. For example, a user may enter commands to switch modes (e.g., color mode, monochrome mode), view the number of images printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48 or by additional media trays.

Image forming device 20 includes an image transfer section that includes one or more imaging stations 50. Each imaging station 50 includes a toner cartridge 100, a developer unit 200 and a photoconductive unit (PC unit) 300. Each toner cartridge 100 includes a reservoir 102 for holding toner and an outlet port in communication with an inlet port of a corresponding developer unit 200 for transferring toner from reservoir 102 to developer unit 200 as discussed in greater detail below. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. In another embodiment, developer unit 200 utilizes what is commonly referred to as a dual component development system. In this embodiment, toner in toner reservoir 202 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer roll 206 attracts the magnetic carrier beads having toner thereon to developer roll 206 through the use of magnetic fields. Each PC unit 300 includes a charging roll 304 and a photoconductive (PC) drum 302 for each imaging station 50. PC drums 302 are mounted substantially parallel to each other. For purposes of clarity, developer unit 200 and PC unit 300 are labeled on only one of the imaging stations 50 in FIG. 1. In the example embodiment illustrated, each imaging station 50 is substantially the same except for the color or type of toner contained therein.

Each charging roll 304 forms a nip with the corresponding PC drum 302. During a print operation, charging roll 304 charges the surface of PC drum 302 to a specified voltage. A laser beam from a printhead 52 associated with each imaging station 50 is then directed to the surface of PC drum 302 and selectively discharges those areas it contacts to form a latent image. Developer roll 206 then transfers toner to PC drum 302 to form a toner image. A metering device, such as a doctor blade 208, may be used to meter toner on developer roll 206 and apply a desired charge to the toner prior to its transfer to PC drum 302. Toner is attracted to the areas of PC drum 302 surface discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 302 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 302.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

A monocolor image forming device 20 may include a single imaging station 50, as compared to a color image forming device 20 that may include multiple imaging stations 50.

Figure 2A:
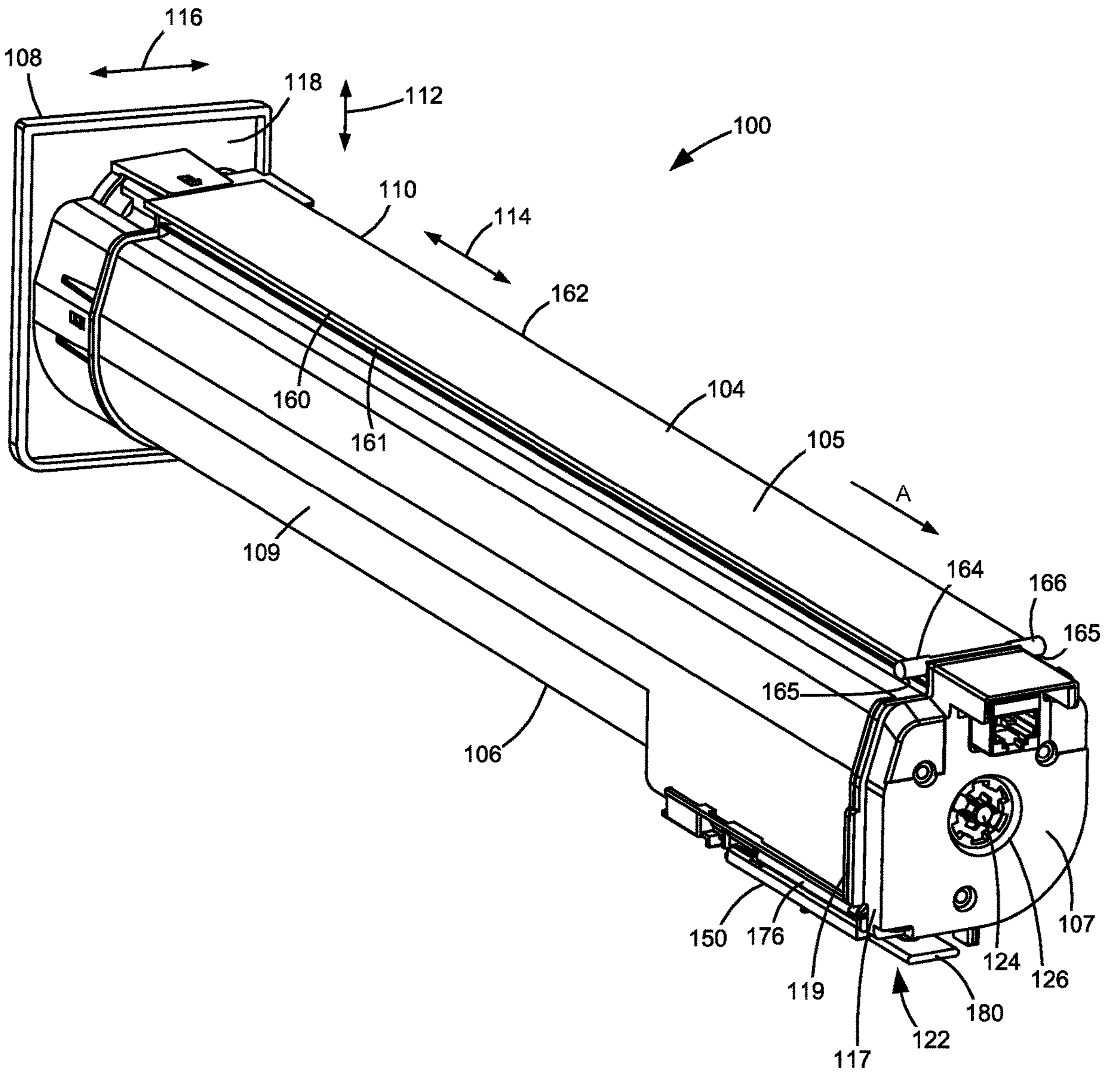
FIGS. 2A and 2B are perspective views of a toner cartridge according to one example embodiment.
Figure 2B:
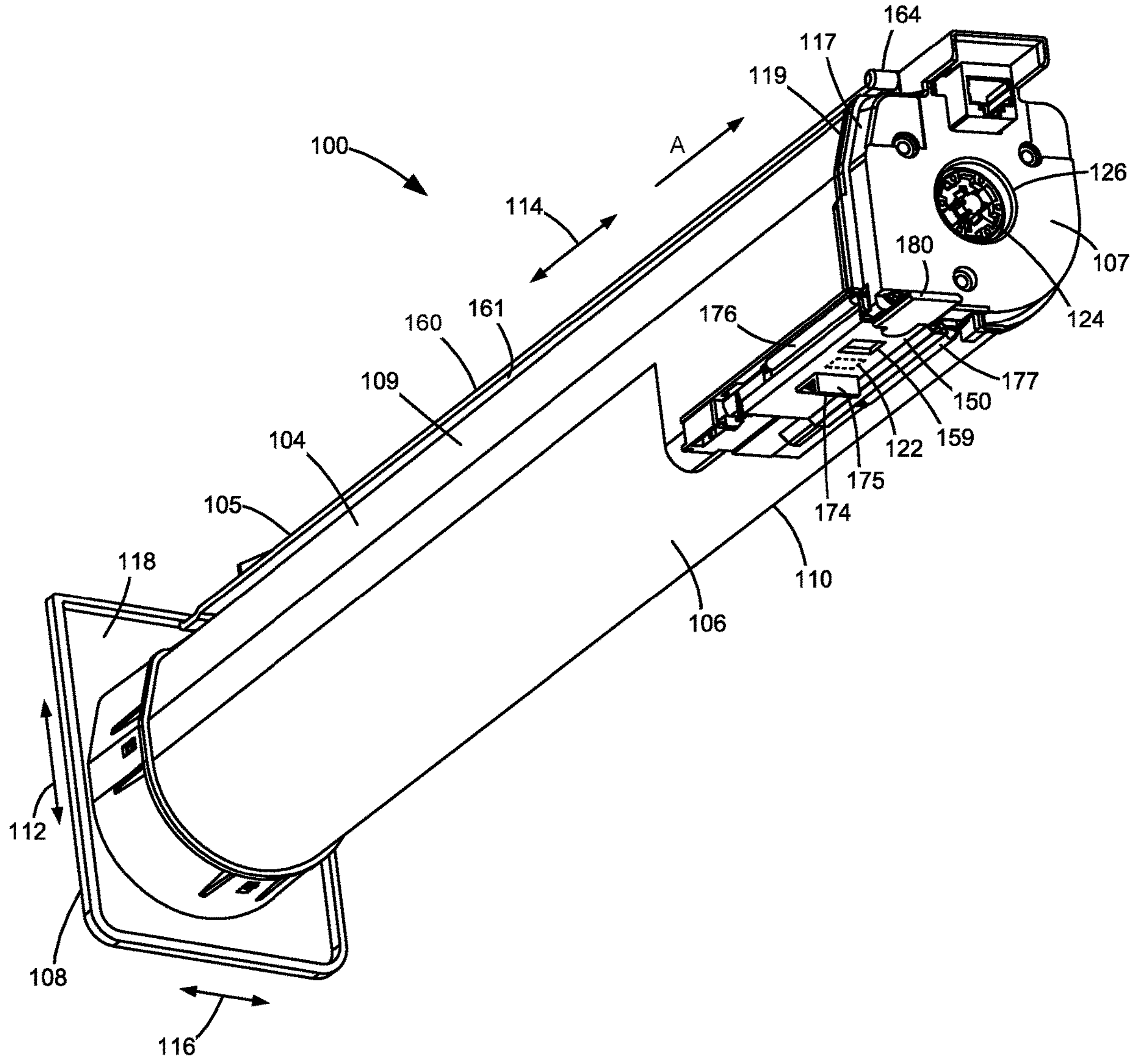

FIGS. 2A and 2B show toner cartridge 100 according to one example embodiment. Toner cartridge 100 includes a body 104 housing toner reservoir 102 therein. Body 104 includes a top 105, a bottom 106, a front end 107, a rear end 108 and a pair of sides 109, 110. Body 104 has a height measured along a vertical dimension 112 of toner cartridge 100 between top 105 and bottom 106, a length measured along a longitudinal dimension 114 of toner cartridge 100 orthogonal to vertical dimension 112 between front end 107 and rear end 108, and a width measured along a side-to-side dimension 116 of toner cartridge 100 orthogonal to vertical dimension 112 and longitudinal dimension 114 between side 109 and side 110. In the example embodiment illustrated, each end 107, 108 of body 104 includes a respective end cap 117, 118 mounted on a corresponding end wall, such as by suitable fasteners (e.g., screws, rivets, etc.) or by a snap-fit engagement. In this embodiment, an end wall 119 at front end 107 and an end wall (not shown) at rear end 108 along with top 105, bottom 106 and sides 109, 110 form toner reservoir 102. In the example embodiment illustrated, toner cartridge 100 is inserted into image forming device 20 generally along longitudinal dimension 114 in the direction indicated by arrow A in FIGS. 2A and 2B with front end 107 of body 104 leading and rear end 108 of body 104 trailing.

As used herein, the terms “front” and “rear” correspond to the direction of travel of toner cartridge 100 during insertion of toner cartridge 100 into image forming device 20 rather than any particular orientation of image forming device 20. For example, in one embodiment, image forming device 20 is primarily operated, for example, accessing a user interface, media tray(s), supply item(s) (such as toner cartridge 100, developer unit 200, and PC unit 300) and other features of image forming device 20, at a side proximate to rear end 108 of body 104 of toner cartridge 100.

Toner cartridge 100 includes an outlet port 122 for exiting toner from reservoir 102, such as when transferring toner to an inlet port of developer unit 200. In the example embodiment illustrated, outlet port 122 is formed as a downward facing opening on bottom 106 of body 104, next to front end 107 of body 104, such as next to an inner side of end wall 119. A shutter 150 is positioned at outlet port 122 to regulate whether toner is permitted to flow from reservoir 102 out of outlet port 122. Shutter 150 may be referred to herein as cartridge shutter 150. Cartridge shutter 150 is translatable along longitudinal dimension 114 between a closed position blocking outlet port 122 to prevent toner from escaping outlet port 122 and an open position unblocking outlet port 122 to permit toner to exit outlet port 122.

Toner cartridge 100 also includes a drive coupler 124 that mates with and receives rotational power from a corresponding drive coupler in image forming device 20 when toner cartridge 100 is installed in image forming device 20 in order to provide rotational power to various rotatable components of toner cartridge 100, such as toner agitators positioned within reservoir 102 for moving toner to outlet port 122. In the example embodiment illustrated, drive coupler 124 is positioned on front end 107 of body 104, for example, higher than outlet port 122. In the embodiment illustrated, drive coupler 124 is positioned on an outer surface of end wall 119 and exposed through an opening 126 in end cap 117 such that drive coupler 124 is unobstructed to mate with the corresponding drive coupler in image forming device 20 when toner cartridge 100 is installed in image forming device 20.

In the example embodiment illustrated, toner cartridge 100 includes a pair of guide rails 160, 162 that extend along longitudinal dimension 114 of toner cartridge 100 at top 105 of body 104. In this embodiment, guide rails 160, 162 are formed as cantilevered extensions that extend outward in opposite directions along side-to-side dimension 116 of toner cartridge 100 at top 105 of body 104. Specifically, guide rail 160 extends along side-to-side dimension 116 toward side 109 of body 104, and guide rail 162 extends along side-to-side dimension 116 toward side 110 of body 104. Each guide rail 160, 162 includes a bottom contact surface 161 that is positioned to contact and ride along the top surface of a corresponding guide rail positioned at an entrance of toner cartridge 100 to image forming device 20 during insertion of toner cartridge 100 into image forming device 20 in order to guide insertion of toner cartridge 100 into image forming device 20 in the direction indicated by arrow A in FIGS. 2A and 2B with front end 107 of body 104 leading and rear end 108 of body 104 trailing. In the example embodiment illustrated, guide rails 160, 162 run along nearly the entire length of body 104 of toner cartridge 100 along longitudinal dimension 114 of toner cartridge 100, from end wall 119 at front end 107 of body 104 to an inner end of end cap 118 at rear end 108 of body 104.

In the example embodiment illustrated, respective guide pins or posts 164, 166 project outward in opposite directions along side-to-side dimension 116 of toner cartridge 100 at a front end of each guide rail 160, 162. Specifically, guide post 164 extends along side-to-side dimension 116 toward side 109 of body 104, and guide post 166 extends along side-to-side dimension 116 toward side 110 of body 104. Guide posts 164, 166 extend further outward along side-to-side dimension 116 of toner cartridge 100 than guide rails 160, 162. In this embodiment, guide posts 164, 166 are positioned at end wall 119 at front end 107 of body 104. Each guide post 164, 166 includes a bottom contact surface 165 that is positioned to contact and ride along the top surface of a corresponding guide rail that runs along the length of a guide slot that receives toner cartridge 100 in image forming device 20 during insertion of toner cartridge 100 into image forming device 20 in order to further guide insertion of toner cartridge 100 into image forming device 20 in the direction indicated by arrow A in FIGS. 2A and 2B.

Contact between bottom contact surfaces 161 of guide rails 160, 162 of toner cartridge 100 and the top surfaces of corresponding guide rails positioned at an entrance to image forming device 20 and between bottom contact surfaces 165 of guide posts 164, 166 of toner cartridge 100 and the top surfaces of corresponding guide rails that run along the length of a guide slot that receives toner cartridge 100 in image forming device 20 controls the position of toner cartridge 100 along vertical dimension 112 during insertion of toner cartridge 100 into image forming device 20 and removal of toner cartridge 100 from image forming device 20 and may aid in positioning toner cartridge 100 along vertical dimension 112 when toner cartridge 100 is in its final installed position in image forming device 20. Contact between guide rails 160, 162 and guide posts 164, 166 of toner cartridge 100 and their corresponding guide rails in image forming device 20 may also aid in controlling the position of toner cartridge 100 along side-to-side dimension 116 and limiting rotation of toner cartridge 100 during insertion of toner cartridge 100 into image forming device 20 and removal of toner cartridge 100 from image forming device 20.

Figure 3A:
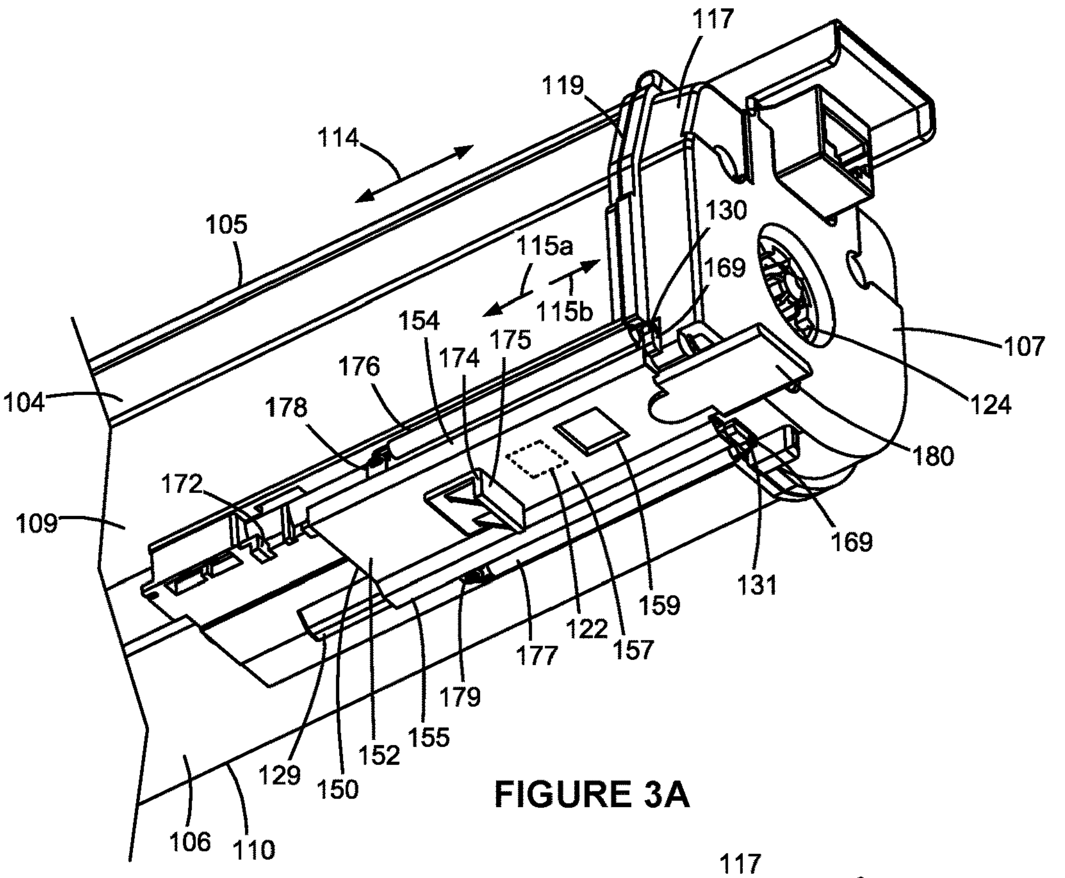
FIGS. 3A and 3B are perspective views of the toner cartridge shown in FIGS. 2A and 2B showing a cartridge shutter of the toner cartridge in a closed position and an open position, respectively, according to one example embodiment.
Figure 3B:
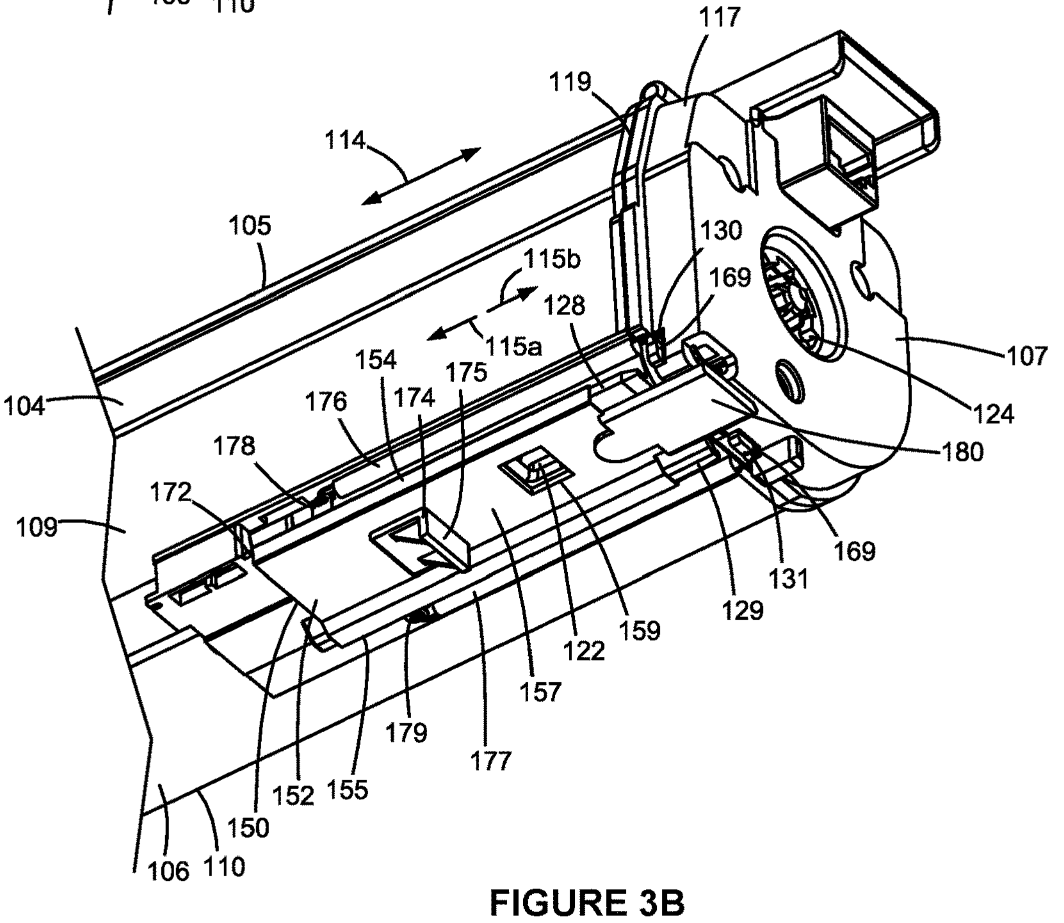
Figure 4A:
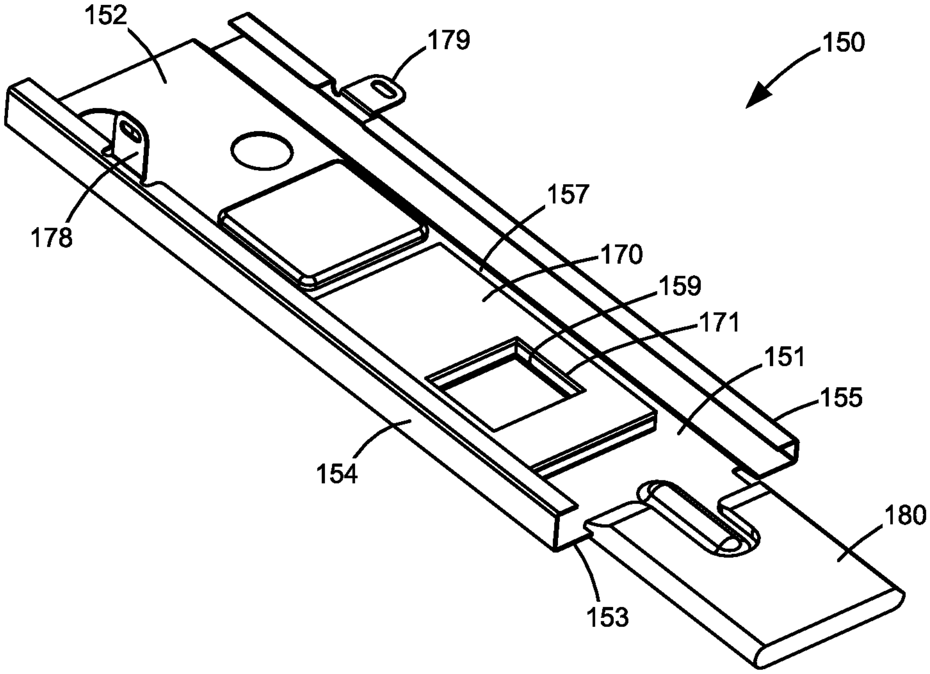
FIGS. 4A and 4B are perspective views of the cartridge shutter shown in FIGS. 3A and 3B.
Figure 4B:
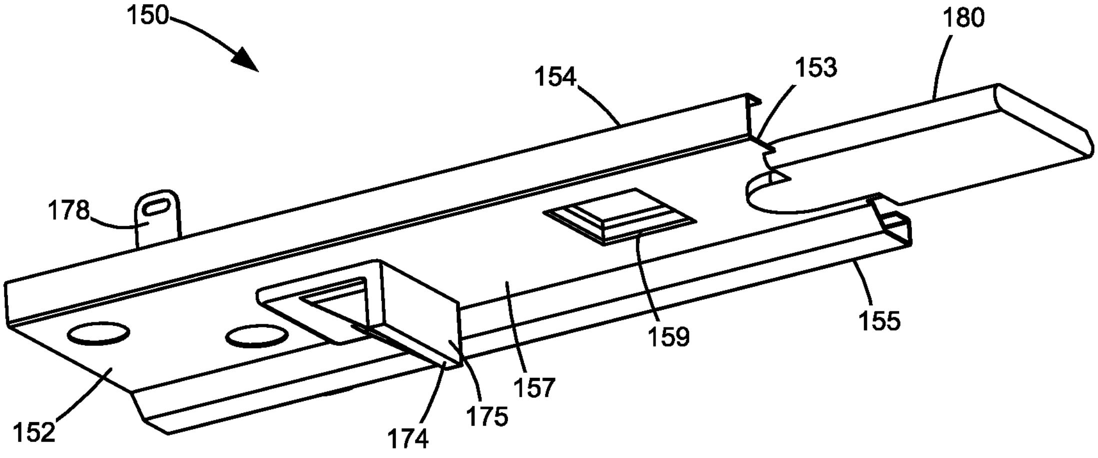

FIGS. 3A and 3B show the area of toner cartridge 100 around outlet port 122 and cartridge shutter 150 in greater detail according to one example embodiment. In FIGS. 4A and 4B, cartridge shutter 150 is shown in greater detail. With reference to FIGS. 3A-4B, cartridge shutter 150 is positioned on bottom 106 of body 104 and is translatable between the closed position shown in FIG. 3A blocking outlet port 122 to prevent toner from escaping toner cartridge 100 and an open position shown in FIG. 3B unblocking outlet port 122 to permit toner to flow from outlet port 122 of toner cartridge 100. In this embodiment, cartridge shutter 150 moves in a front-to-rear direction 115*a* relative to body 104 as shutter moves from the closed position to the open position and in a rear-to-front direction 115*b* relative to body 104 as cartridge shutter 150 moves from the open position to the closed position.

In the embodiment illustrated, cartridge shutter 150 includes a base 152 and flanges 154, 155 that extend upward from base 152 on opposite sides of base 152. A pair of ledges 128, 129 on bottom 106 of body 104 run along longitudinal dimension 114 and extend away from each other toward opposite sides 109, 110 of body 104. Each flange 154, 155 of cartridge shutter 150 wraps over the top of a respective ledge 128, 129 to retain cartridge shutter 150 on toner cartridge 100. When cartridge shutter 150 moves between the closed and open positions, flanges 154, 155 slide across top surfaces and outer side surfaces of ledges 128, 129. In this manner, ledges 128, 129 serve as rails that guide the movement of cartridge shutter 150 between the closed and open positions. Base 152 includes a blocking portion 157 and a window 159. Blocking portion 157 blocks outlet port 122 when cartridge shutter 150 is in the closed position as shown in FIG. 3A. When cartridge shutter 150 is in the open position, window 159 aligns with outlet port 122 as shown in FIG. 3B to allow toner to exit outlet port 122.

In the embodiment illustrated, cartridge shutter 150 includes a seal 170 on a top surface 151 of cartridge shutter 150 surrounding window 159 on blocking portion 157. When cartridge shutter 150 is assembled onto toner cartridge 100, seal 170 is sandwiched between cartridge shutter 150 and bottom 106 of body 104 to block toner from leaking from outlet port 122. In one embodiment, seal 170 is fixed to base 152 of cartridge shutter 150 and moves with cartridge shutter 150 against bottom 106 of body 104. In this embodiment, seal 170 includes an opening 171 that is aligned and fixed relative to window 159. In another embodiment, seal 170 may be fixed on a bottom surface of body 104 surrounding outlet port 122. In this embodiment, seal 170 includes an opening that is aligned and fixed relative to outlet port 122.

Cartridge shutter 150 is biased toward the closed position blocking outlet port 122. In the embodiment illustrated, one or more biasing springs, such as extension springs 176, 177 bias cartridge shutter 150 towards the closed position. In the embodiment illustrated, each spring 176, 177 has one end connected to a respective spring mount 130, 131 near front end 107 of toner cartridge 100 and another end connected to a respective spring mount 178, 179 extending from a corresponding flange 154, 155 of cartridge shutter 150. While the example embodiment illustrated includes extension springs 176, 177, it will be appreciated that cartridge shutter 150 may be biased relative to body 104 by any suitable biasing member as desired, including, for example, one or more compression springs, torsion springs, leaf springs, or other materials having resilient properties.

Cartridge shutter 150 moves toward rear end 108 when shutter 150 moves from the closed position to the open position and toward front end 107 when shutter 150 moves from the open position to the closed position. Cartridge shutter 150 includes forward and rearward stops that prevent cartridge shutter 150 from overtraveling along ledges 128, 129. In the example embodiment illustrated, forward stops 169 are positioned at the front ends of ledges 128, 129. Contact between front ends of flanges 154, 155 of cartridge shutter 150 and forward stops 169 limits forward travel of cartridge shutter 150 toward front end 107. A rearward stop 172 is positioned near the rear end of ledge 128. Contact between rear end of flange 154 of cartridge shutter 150 and rearward stop 172 limits rearward travel of cartridge shutter 150 toward rear end 108.

Cartridge shutter 150 includes a first engagement feature that contacts and pushes open a second shutter of a toner port that is configured to mate with outlet port 122 of toner cartridge 100 during insertion of toner cartridge 100 into image forming device 20. In the embodiment illustrated, cartridge shutter 150 includes a projection 174 downward from base 152 of cartridge shutter 150. In the embodiment illustrated, outlet port 122 is positioned closer to front end 107 of body 104 than projection 174 is to front end 107 of body 104. In addition, window 159 is positioned closer to front end 107 of body 104 than projection 174 is to front end 107 of body 104. Projection 174 has a front face 175 that faces toward front end 107 of body 104. In this embodiment, front face 175 of projection 174 is unobstructed such that front face 175 of projection 174 contacts at least a portion of the second shutter positioned along the insertion path of projection 174 in order for projection 174 to contact and push open the second shutter in direction of insertion A of toner cartridge 100 into image forming device 20 during insertion of toner cartridge 100 into image forming device 20, as discussed in greater detail below.

Cartridge shutter 150 also includes a second engagement feature that engages a corresponding surface in image forming device 20 to open cartridge shutter 150 when toner cartridge 100 is inserted into image forming device 20. In the embodiment illustrated, cartridge shutter 150 includes an extension 180 that protrudes from a front end 153 of cartridge shutter 150 toward and beyond front end 107 of body 104 along longitudinal dimension 114 for contacting a corresponding surface in image forming device 20 during insertion of toner cartridge 100 into image forming device 20. In one embodiment, the corresponding surface in image forming device 20 may be a portion of a basket or tray that holds developer unit 200 in image forming device 20. In another embodiment, the corresponding surface may be an inner wall or frame within image forming device 20. Extension 180 is positioned to receive an actuation force from the corresponding surface in image forming device 20 to move cartridge shutter 150 along longitudinal dimension 114 in front-to-rear direction 115*a* of body 104 from the closed position to the open position. Extension 180 extends forward, for example, in a cantilevered manner, from front end 153 of cartridge shutter 150 along longitudinal dimension 114 in the direction of insertion A of toner cartridge 100 into image forming device 20. When cartridge shutter 150 is in the closed position, extension 180 extends further forward along longitudinal dimension 114 than front end 107 and/or drive coupler 124 of toner cartridge 100 in order to contact the corresponding surface in image forming device 20. In the embodiment illustrated, window 159 is positioned between extension 180 and projection 174 of cartridge shutter 150.

In one example embodiment, projection 174 and/or extension 180 of cartridge shutter 150 may be composed of overmolded plastic. For example, in the embodiment illustrated, base 152 of cartridge shutter 150 may be a formed metal component, and projection 174 and extension 180 may be made of plastic material overmolded onto base 152 of cartridge shutter 150. In other embodiments, base 152, projection 174, and extension 180 of cartridge shutter 150 may be made of any suitable material(s) or manufacturing technique(s) known in the art.

Figure 5:
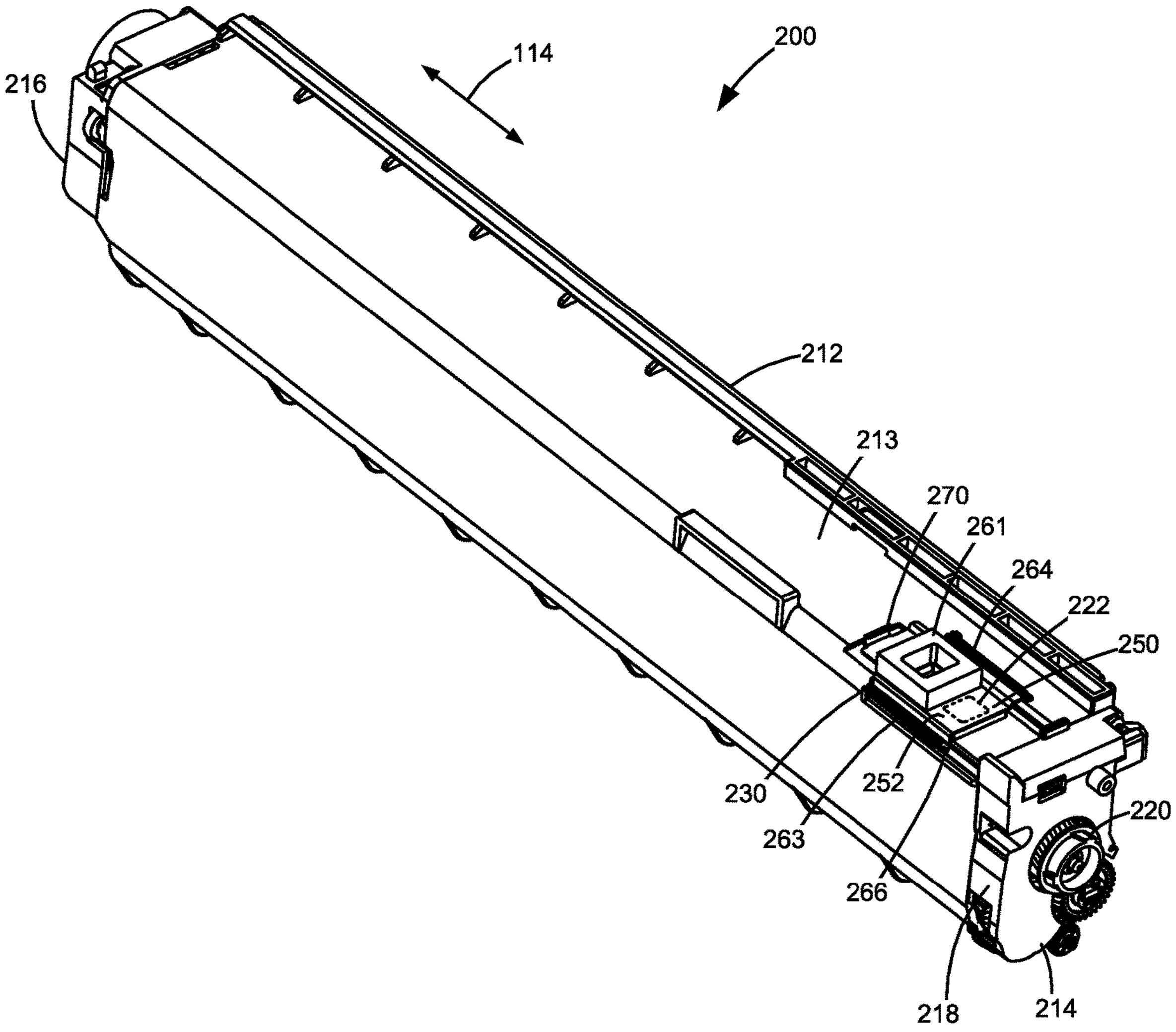
FIG. 5 is a perspective view of a developer unit according to one example embodiment.

FIG. 5 shows developer unit 200 according to one example embodiment. Developer unit 200 includes a housing 212 having reservoir 202 therein. Housing 212 extends generally along longitudinal dimension 114 from a front end 214 to a rear end 216 of housing 212. In the embodiment illustrated, front end 214 of housing 212 includes an end cap 218 mounted by fasteners, such as screws, to a main body of housing 212.

Developer unit 200 includes a drive coupler 220 that mates with and receives rotational power from a corresponding drive coupler in image forming device 20 when developer unit 200 is installed in image forming device 20 in order to provide rotational power to various rotatable components of developer unit 200, such as toner adder roll 204, developer roll 206 and one or more toner agitators positioned within reservoir 202. In the example embodiment illustrated, drive coupler 220 is positioned on front end 214 of housing 212.

Figure 6A:
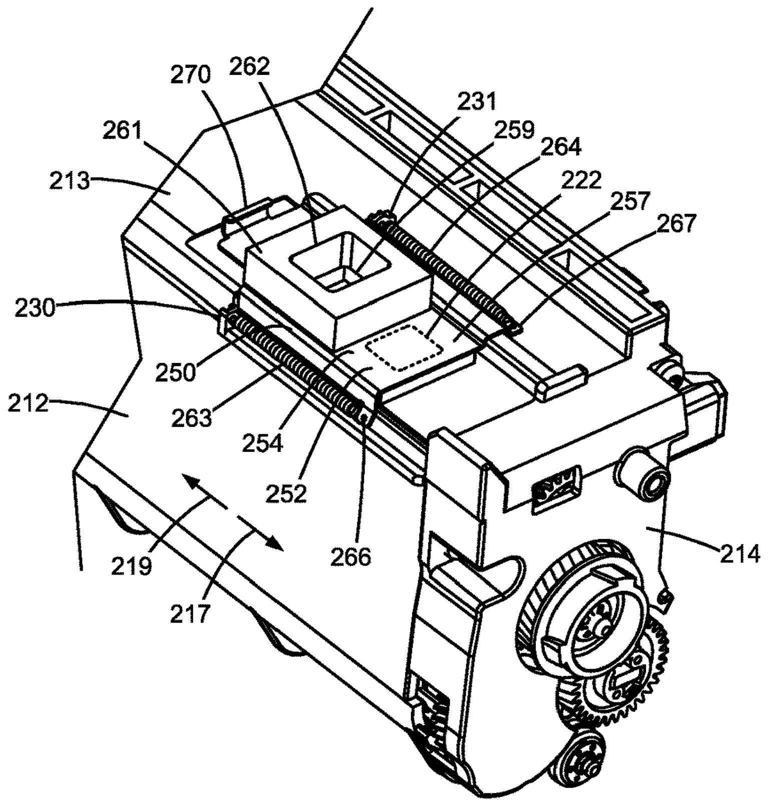
FIGS. 6A and 6B are perspective views of the developer unit shown in FIG. 5 showing a developer shutter of the developer unit in a closed position and an open position, respectively, according to one example embodiment.
Figure 6B:
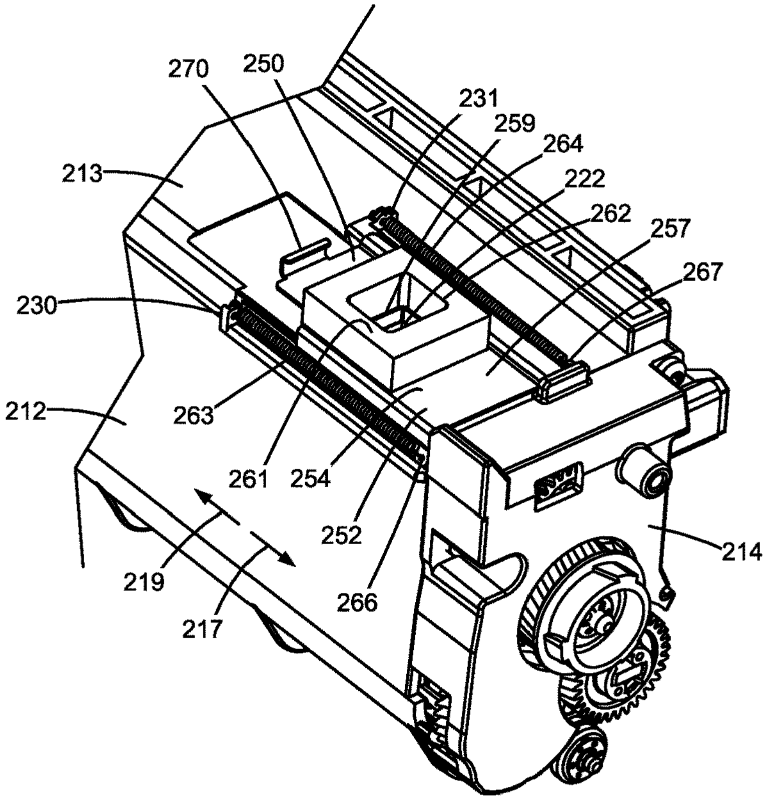

Developer unit 200 includes an inlet port 222 positioned to receive toner from outlet port 122 of toner cartridge 100 to replenish reservoir 202 as toner is consumed from reservoir 202 by the printing process. In the example embodiment illustrated, inlet port 222 is positioned on a top 213 of housing 212 near front end 214. Developer unit 200 includes a shutter 250 that is translatable along longitudinal dimension 114 between a closed position shown in FIG. 6A blocking inlet port 222 to prevent toner from escaping inlet port 222 and an open position shown in FIG. 6B unblocking inlet port 222 to permit toner to enter inlet port 222. Shutter 250 may be referred to herein as developer shutter 250. In the embodiment illustrated, developer shutter 250 moves in a rear-to-front direction 217 relative to housing 212 as developer shutter 250 moves from the closed position to the open position and in a front-to-rear direction 219 relative to housing 212 as developer shutter 250 moves from the open position to the closed position. In this embodiment, developer shutter 250 includes a base 252 having a blocking portion 257 and a window 259. Blocking portion 257 blocks inlet port 222 when developer shutter 250 is in the closed position. When developer shutter 250 is in the open position, window 259 aligns with inlet port 222 to allow toner to enter inlet port 222.

Developer shutter 250 is biased toward the closed position blocking inlet port 222 such as, for example, by one or more extension springs 263, 264. Each extension spring 263, 264 has one end attached to a corresponding spring mount 266, 267 on developer shutter 250 and another end attached to a corresponding spring mount 230, 231 on housing 212. While the example embodiment illustrated includes extension springs 263, 264, it will be appreciated that developer shutter 250 may be biased relative to housing 212 by any suitable biasing member as desired, including, for example, one or more compression springs, torsion springs, leaf springs, or other materials having resilient properties.

In the embodiment illustrated, developer shutter 250 includes a seal 261 surrounding window 259. Seal 261 is fixed to developer shutter 250 and moves with developer shutter 250. In the embodiment illustrated, seal 261 includes an opening 262 that is aligned and fixed relative to window 259. Seal 261 is positioned on a top surface 254 of developer shutter 250 near inlet port 222 to capture any toner leaked between outlet port 122 of toner cartridge 100 and inlet port 222 and to provide a sealing force between cartridge shutter 150 and developer shutter 250 when toner cartridge 100 is inserted into image forming device 20. Although not shown, a seal may be positioned on a bottom surface of developer shutter 250 between base 252 of developer shutter 250 and top 213 of housing 212 of developer unit 200 to help block toner from leaking from inlet port 222.

Developer shutter 250 includes an actuation tab 270 extending upward from developer shutter 250. Actuation tab 270 is positioned along the insertion path of projection 174 of cartridge shutter 150 to receive an actuation force from toner cartridge 100 against the biasing force of extension springs 263, 264 to move developer shutter 250 from the closed position to the open position during insertion of toner cartridge 100 into image forming device 20, as discussed in greater detail below.

FIGS. 7A-7E are sequential views illustrating the interaction of cartridge shutter 150 of toner cartridge 100 with developer shutter 250 of developer unit 200 during insertion of toner cartridge 100 into image forming device 20 with developer unit 200 in its final installed position in image forming device 20 according to one example embodiment. The direction of insertion of toner cartridge 100 into image forming device 20 is indicated by arrow A in FIGS. 7A-7E. As discussed above, toner cartridge 100 is inserted into image forming device 20 generally along longitudinal dimension 114 of toner cartridge 100 with front end 107 of body 104 leading and rear end 108 of body 104 trailing. In the embodiment shown, guide post 164 of toner cartridge 100 travels along a corresponding guide rail 90 in image forming device 20 to assist with the insertion of toner cartridge 100 into image forming device 20. In the example embodiment illustrated, guide post 166 of toner cartridge 100 also travels along a corresponding guide rail (not shown) in image forming device 20 to assist with the insertion of toner cartridge 100 into image forming device 20. It is noted that the operations describing FIGS. 7A-7E have been described using only spring 176 acting on cartridge shutter 150 and spring 263 acting on developer shutter 250 for ease of description.

Figure 7A:
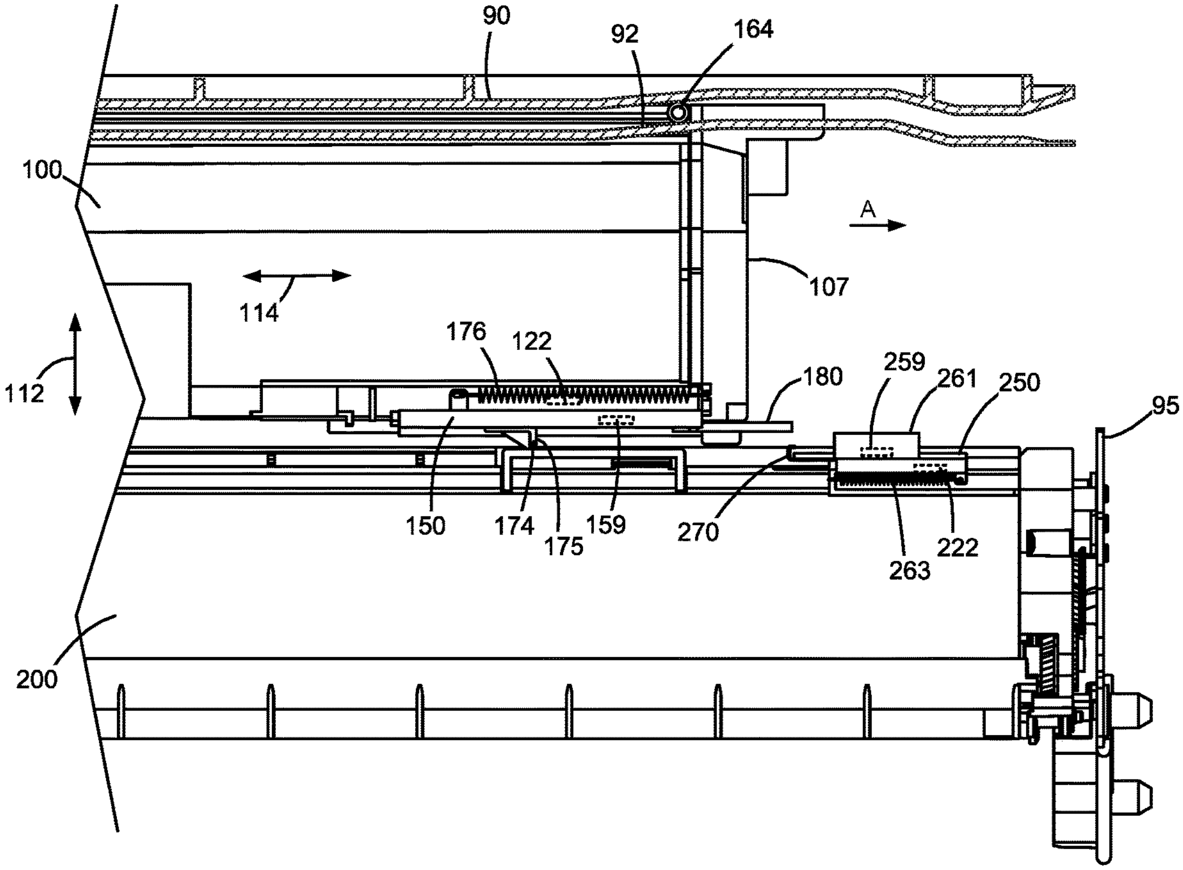
FIGS. 7A-7E are sequential side views showing the interaction of the cartridge shutter and the developer shutter during insertion of the toner cartridge into the image forming device according to one example embodiment.

FIG. 7A shows toner cartridge 100 during insertion into image forming device 20 with cartridge shutter 150 of toner cartridge 100 approaching developer shutter 250 of developer unit 200 as toner cartridge 100 moves in direction of insertion A. Cartridge shutter 150 and developer shutter 250 are in their respective closed positions as a result of the bias applied by springs 176, 263, respectively. When cartridge shutter 150 is in the closed position, outlet port 122 of toner cartridge 100 and window 159 of cartridge shutter 150 are misaligned along vertical dimension 112. When developer shutter 250 is in the closed position, inlet port 222 of developer unit 200 and window 259 of developer shutter 250 are misaligned along vertical dimension 112.

Figure 7B:
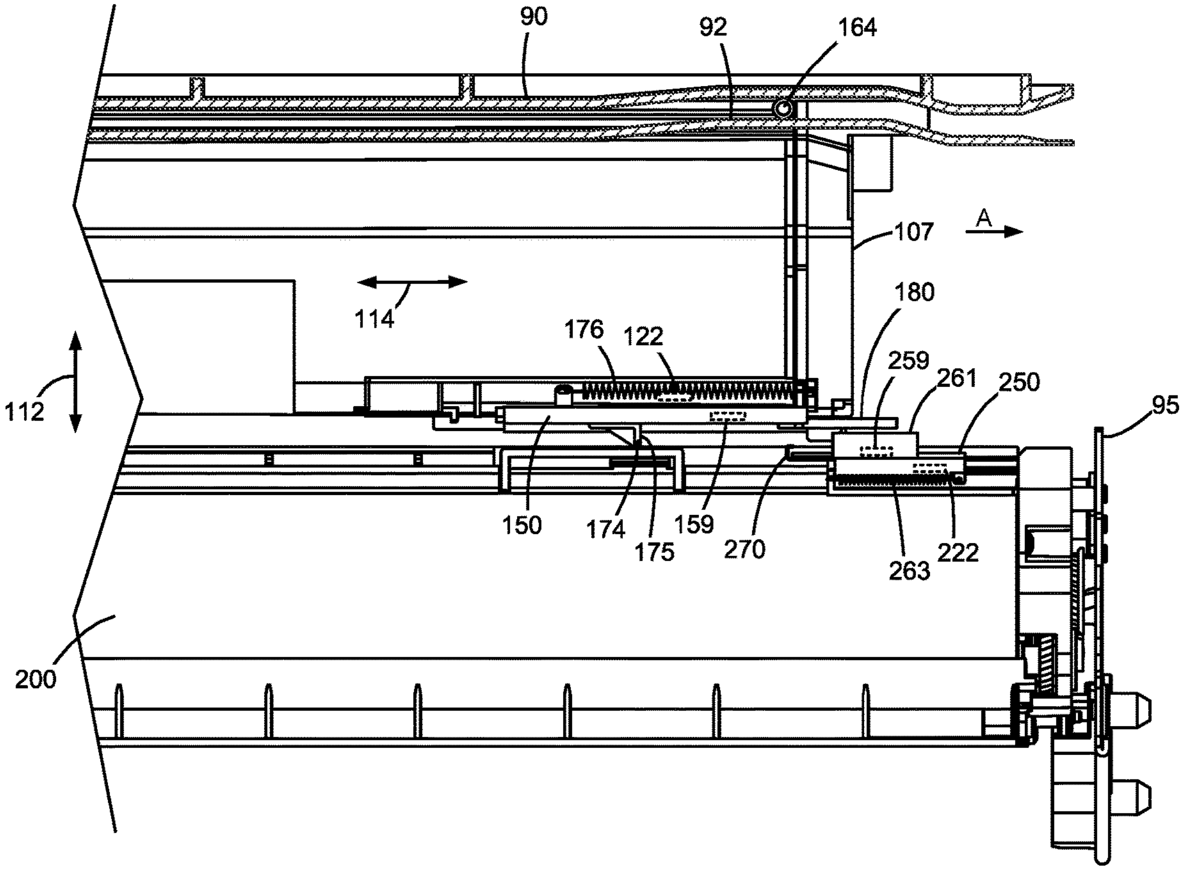

FIG. 7B shows toner cartridge 100 advanced forward in the direction of insertion A of toner cartridge 100 from the position shown in FIG. 7A. In the embodiment illustrated, guide post 164 moves up a raised section 92 of guide rail 90 causing front end 107 of toner cartridge 100 to move upward relative to developer unit 200 allowing extension 180 of cartridge shutter 150 to lift away from developer shutter 250. As guide post 164 travels along raised section 92 of guide rail 90, extension 180 of cartridge shutter 150 moves forward in direction of insertion A above developer shutter 250, clear of seal 261 in order to avoid damaging seal 261, which could cause toner leakage or failure of toner to flow through opening 262 of seal 261.

Figure 7C:
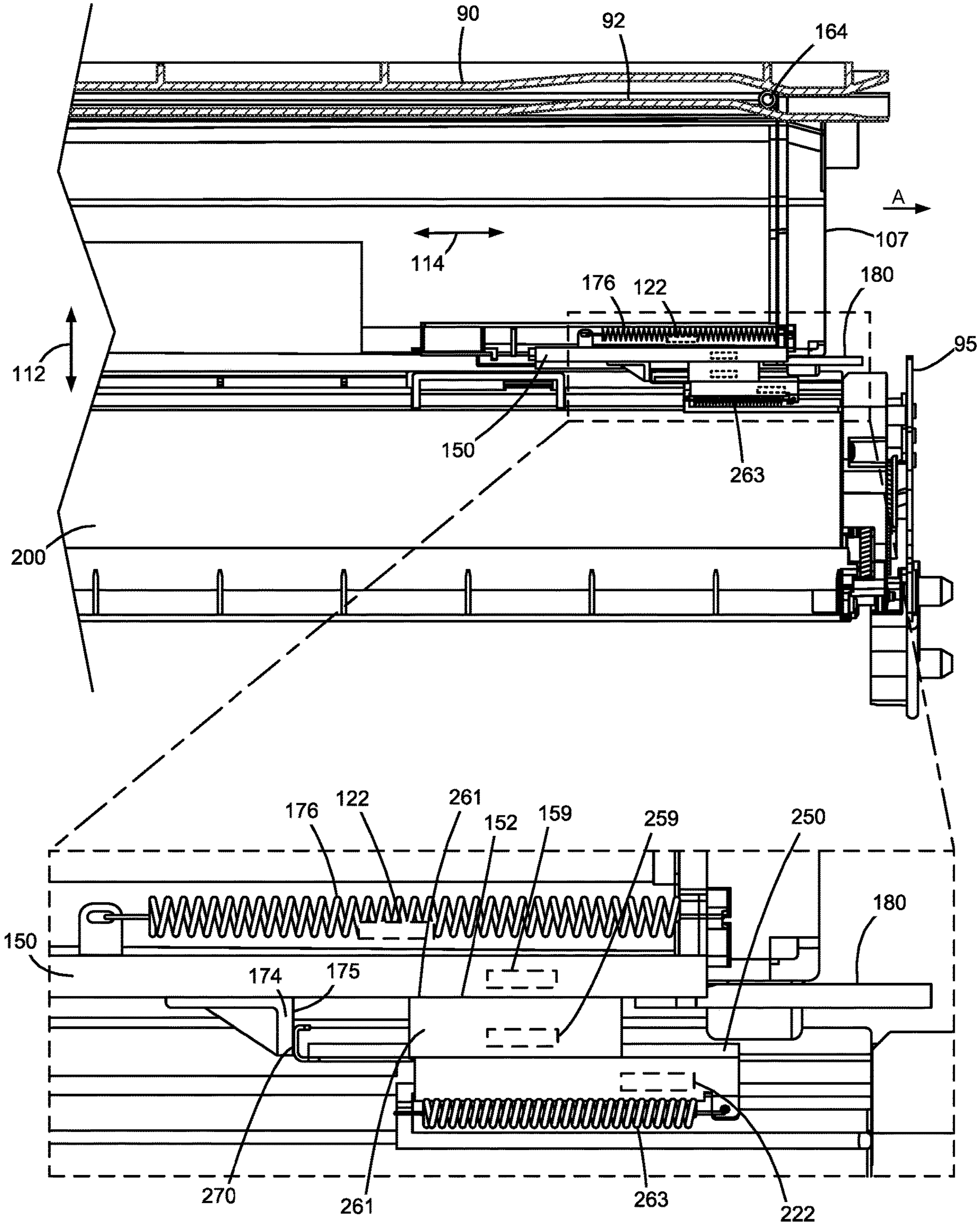

As toner cartridge 100 advances further forward in the direction of insertion A of toner cartridge 100 from the position shown in FIG. 7B, extension 180 of cartridge shutter 150 moves past seal 261 of developer shutter 250 as shown in FIG. 7C. Guide post 164 moves down raised section 92 of guide rail 90 causing front end 107 of toner cartridge 100 to move downward allowing base 152 of cartridge shutter 150 to contact seal 261 of developer shutter 250. Further, in the embodiment illustrated, front face 175 of projection 174 of cartridge shutter 150 contacts actuation tab 270 of developer shutter 250. In the position shown, window 159 of cartridge shutter 150 aligns with window 259 of developer shutter 250 along vertical dimension 112 while cartridge shutter 150 and developer shutter 250 remain in their respective closed positions. In this embodiment, seal 261 of developer shutter 250 contacts base 152 of cartridge shutter 150 in the area surrounding window 159 of cartridge shutter 150 prior to developer shutter 250 moving from the closed position toward the open position in order to seal the interface between cartridge shutter 150 and developer shutter 250 prior to opening shutters 150, 250 in order to help contain the toner transferring from outlet port 122 of toner cartridge 100 to inlet port 222 of developer unit 200 and reduce toner leakage.

Figure 7D:
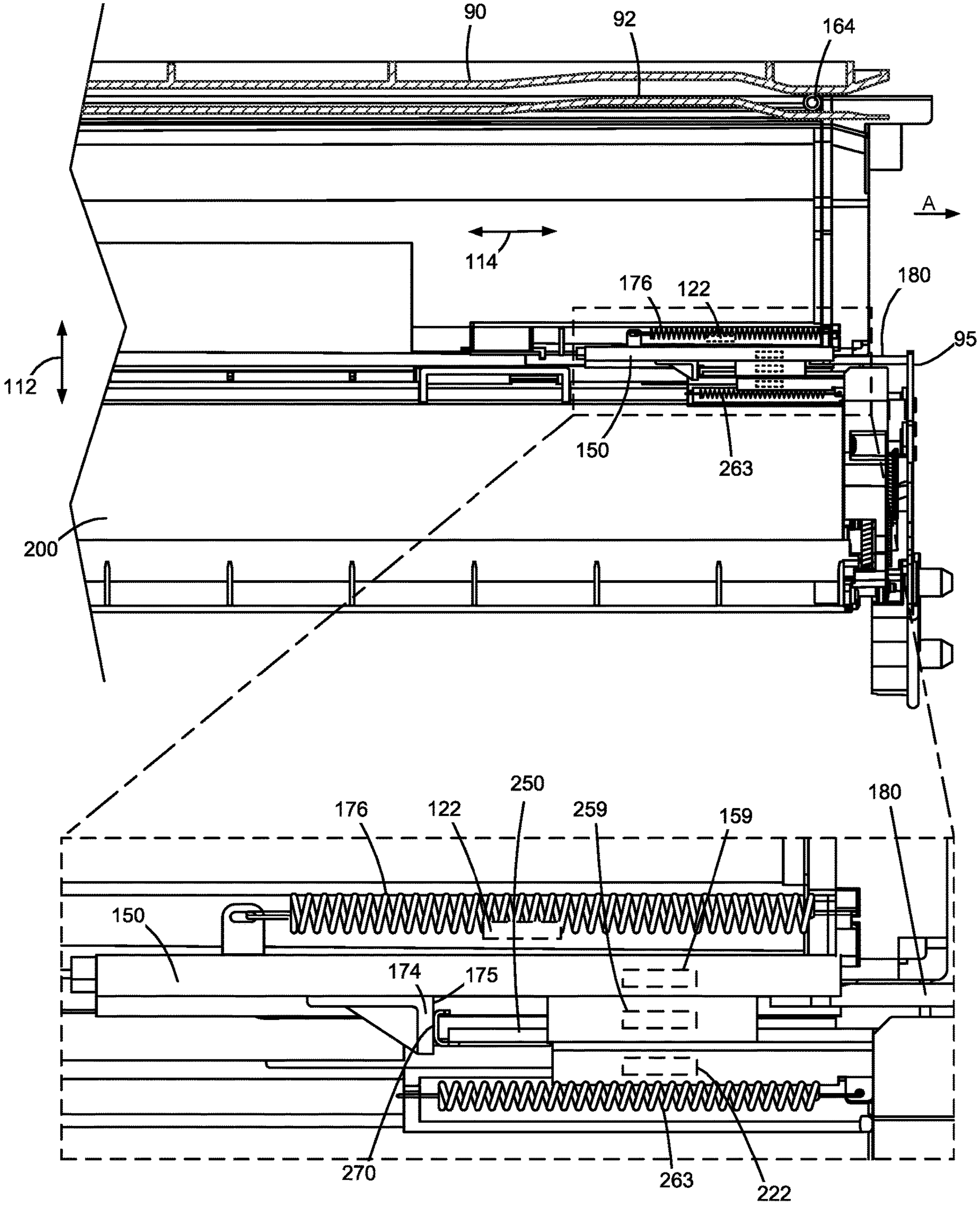

FIG. 7D shows toner cartridge 100 advanced forward in the direction of insertion A from the position shown in FIG. 7C just prior to toner cartridge 100 reaching its final installed position in image forming device 20. As toner cartridge 100 advances from the position shown in FIG. 7C with front face 175 of projection 174 of cartridge shutter 150 in contact with actuation tab 270 of developer shutter 250, the force applied to developer shutter 250 by projection 174 of cartridge shutter 150 overcomes the bias applied to developer shutter 250 by spring 263 allowing projection 174 of cartridge shutter 150 to push developer shutter 250 toward its open position. When projection 174 of cartridge shutter 150 has pushed developer shutter 250 to its open position, window 159 of cartridge shutter 150 and window 259 of developer shutter 250 align with inlet port 222 of developer unit 200. Further, in the embodiment illustrated, extension 180 of cartridge shutter 150 begins to contact an engagement surface 95 in image forming device 20 as developer shutter 250 reaches the open position.

In one embodiment, the respective biasing forces urging cartridge shutter 150 and developer shutter 250 towards their closed positions are selected such that the biasing force on cartridge shutter 150 prevents the reaction force applied to projection 174 of cartridge shutter 150 by actuation tab 270 from moving cartridge shutter 150 to a position unblocking outlet port 122 of toner cartridge 100 as projection 174 of cartridge shutter 150 pushes open developer shutter 250 during insertion of toner cartridge 100 into image forming device 20. In one embodiment, extension springs 176, 177 acting on cartridge shutter 150 may have a combined spring force that holds cartridge shutter 150 in its closed position and/or prevents cartridge shutter 150 from unblocking outlet port 122 while cartridge shutter 150 pushes open developer shutter 250. For example, the combined spring force of extension springs 176, 177 that biases cartridge shutter 150 towards its closed position may be greater than the combined spring force of extension springs 263, 264 that biases developer shutter 250 towards its closed position to allow cartridge shutter 150 to move developer shutter 250 in rear-to-front direction 217 (direction of insertion A) against the biasing force of extension springs 263, 264 of developer shutter 250 to unblock inlet port 222 of developer unit 200 without causing cartridge shutter 150 to move in front-to-rear direction 115*a* relative to toner cartridge 100 against the biasing force of extension springs 176, 177 of cartridge shutter 150 to unblock outlet port 122 of toner cartridge 100.

Figure 7E:
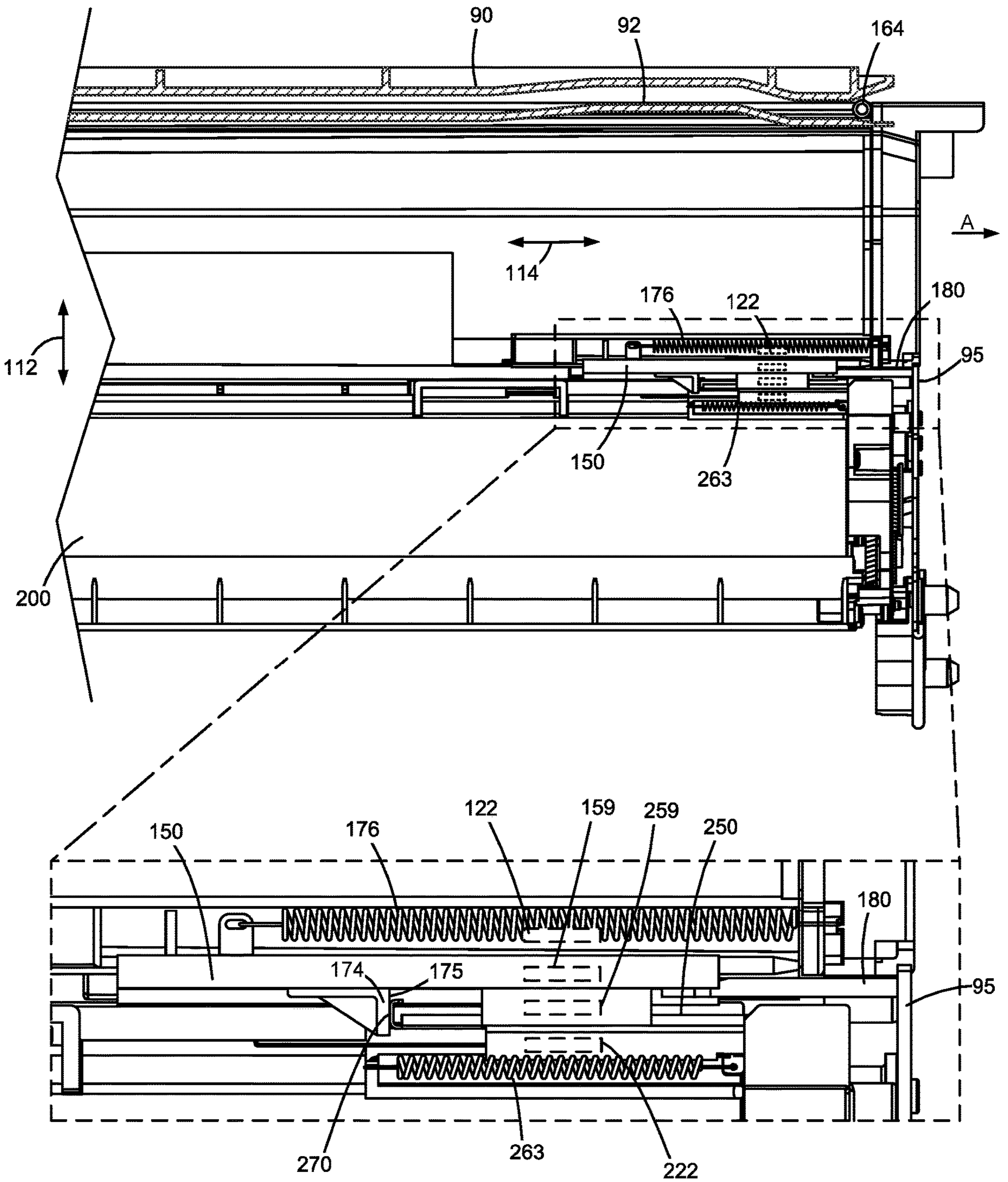

FIG. 7E shows toner cartridge 100 in its final installed position in image forming device 20, advanced forward in the direction of insertion A of toner cartridge 100 from the position shown in FIG. 7D. As toner cartridge 100 advances in direction of insertion A with extension 180 of cartridge shutter 150 in contact with engagement surface 95 in image forming device 20, the force applied to extension 180 of cartridge shutter 150 by engagement surface 95 overcomes the bias applied to cartridge shutter 150 by springs 176, 177 allowing engagement surface 95 to hold cartridge shutter 150 in place (i.e., stationary relative to developer unit 200) against the biasing force of springs 176, 177 as toner cartridge 100 moves towards its final installed position. In this manner, developer shutter 250 is held in its open position by cartridge shutter 150 while cartridge shutter 150, although stationary relative to image forming device 20, moves relative to body 104 of toner cartridge 100 toward its open position as toner cartridge 100 moves in direction of insertion A towards its final position in image forming device 20. In the embodiment illustrated, engagement surface 95 forms part of a basket or tray that holds developer unit 200 in image forming device 20. In other embodiments, any internal feature or datum in image forming device 20 may contact extension 180 of cartridge shutter 150 to hold cartridge shutter 150 in place while toner cartridge 100 moves toward its final installed position in image forming device 20. In other embodiments, developer shutter 250 contacts a stop upon reaching the open position of developer shutter 250 and contact between front face 175 of projection 174 of cartridge shutter 150 and actuation tab 270 of developer shutter 250 holds cartridge shutter 150 in place while toner cartridge 100 moves toward its final installed position in image forming device 20.

In the example embodiment illustrated, when toner cartridge 100 is fully inserted into image forming device 20, in its final installed position in image forming device 20, contact between engagement surface 95 in image forming device 20 and extension 180 of cartridge shutter 150 of toner cartridge 100 holds cartridge shutter 150 in the open position which, in turn, holds developer shutter 250 in the open position as a result of contact between front face 175 of projection 174 of cartridge shutter 150 and actuation tab 270 of developer shutter 250. In this embodiment, when toner cartridge 100 in its final installed position in image forming device 20, a latch in image forming device 20 restrains toner cartridge 100 in a direction from front end 107 of body 104 toward rear end 108 of body 104 along longitudinal dimension 114, overcoming the spring force from springs 176, 177 on toner cartridge 100 and the reaction force applied to projection 174 of cartridge shutter 150 by actuation tab 270 of developer shutter 250 and preventing these forces from pushing toner cartridge 100 out of image forming device 20. When cartridge shutter 150 and developer shutter 250 are in their respective open positions, outlet port 122 and window 159 of cartridge shutter 150 of toner cartridge 100 are aligned with inlet port 222 and window 259 of developer shutter 250 of developer unit 200.

When toner cartridge 100 is removed from image forming device 20, the above sequence is reversed. The biasing force applied by springs 176, 177 returns cartridge shutter 150 of toner cartridge 100 to the closed position as toner cartridge 100 moves from the position shown in FIG. 7E to the position shown in FIG. 7D, and the biasing force applied by springs 263, 264 returns developer shutter 250 to the closed position as toner cartridge 100 moves from the position shown in FIG. 7D to the position shown in FIG. 7C.

The above example embodiments show projection 174 that pushes open developer shutter 250 projecting from cartridge shutter 150. In other embodiments, body 104 of toner cartridge 100 may include an engagement surface on body 104, for example, projecting downward at the bottom 106 of body 104 and adjacent to front end 107 of body 104, for contacting and pushing open developer shutter 250 in the direction of insertion A of toner cartridge 100 into image forming device 20.

Further, although the example image forming device 20 discussed above includes four toner cartridges 100 and corresponding developer units 200 and PC units 300, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container for use with a developer unit of an image forming device, comprising:

a body having a top, a bottom, a first side and a second side positioned between a front and a rear of the body, the front of the body leads during insertion of the toner container into the image forming device and the rear of the body trails during insertion of the toner container into the image forming device, the body has a reservoir for holding toner;

an outlet port on the bottom of the body and adjacent to the front of the body for exiting toner from the toner container; and an engagement surface at the bottom of the body and adjacent to the front of the body for contacting and pushing open a developer shutter of an inlet port of the developer unit in a direction of insertion of the toner container into the image forming device during insertion of the toner container into the image forming device.

2. The toner container of claim 1, further comprising a toner container shutter that is movable between a closed position blocking the outlet port and an open position unblocking the outlet port, wherein the toner container shutter includes the engagement surface.

3. The toner container of claim 2, wherein the engagement surface projects downward from a bottom surface of the toner container shutter.

4. The toner container of claim 2, wherein the toner container shutter is spring biased towards the closed position and the front of the body, wherein the outlet port is positioned closer to the front of the body than the engagement surface is to the front of the body when the toner container shutter is in the closed position.

5. The toner container of claim 1, wherein the outlet port is positioned closer to the front of the body than the engagement surface is to the front of the body.

6. A toner container for use with a developer unit of an image forming device, comprising:

a body having a top, a bottom, a first side and a second side positioned between a first longitudinal end and a second longitudinal end of the body, the first longitudinal end of the body leads during insertion of the toner container into the image forming device and the second longitudinal end of the body trails during insertion of the toner container into the image forming device, the body has a reservoir for holding toner;

an outlet port on the bottom of the body and adjacent to the first longitudinal end of the body for exiting toner from the toner container;

a drive coupler on the first longitudinal end of the body for mating with a corresponding drive coupler in the image forming device when the toner container is installed in the image forming device for receiving rotational motion from the corresponding drive coupler in the image forming device; and an engagement member projecting downward at the bottom of the body and adjacent to the first longitudinal end of the body, a front face of the engagement member that faces toward the first longitudinal end of the body is unobstructed to contact and push open a developer shutter of an inlet port of the developer unit in a direction from the second longitudinal end of the body toward the first longitudinal end of the body during is insertion of the toner container into the image forming device.

7. The toner container of claim 6, further comprising a toner container shutter that is movable between a closed position blocking the outlet port and an open position unblocking the outlet port, wherein the toner container shutter includes the engagement member.

8. The toner container of claim 7, wherein the engagement member projects downward from a bottom surface of the toner container shutter.

9. The toner container of claim 7, wherein the toner container shutter is translatable between the closed position and the open position and spring biased towards the closed position and the first longitudinal end of the body, wherein the outlet port is positioned closer to the first longitudinal end of the body than the front face of the engagement member is to the first longitudinal end of the body when the toner container shutter is in the closed position.

10. The toner container of claim 7, further comprising an extension protruding from the toner container shutter in a direction from the second longitudinal end of the body toward the first longitudinal end of the body and unobstructed at the first longitudinal end of the body for contacting a corresponding surface in the image forming device during insertion of the toner container into the image forming device and receiving an actuation force from the corresponding surface in the image forming device to move the toner container shutter relative to the body in a direction from the first longitudinal end of the body toward the second longitudinal end of the body from the closed position to the open position during insertion of the toner container into the image forming device.

11. The toner container of claim 10, wherein the extension has a free end that extends farther than the first longitudinal end of the body in the direction from the second longitudinal end of the body toward the first longitudinal end of the body when the toner container shutter is in the closed position to contact the corresponding surface in the image forming device.

12. The toner container of claim 6, wherein the outlet port is positioned closer to the first longitudinal end of the body than the front face of the engagement member is to the first longitudinal end of the body.

13. A toner container for use with a developer unit of an image forming device, comprising:

a body having a reservoir for storing toner;

an outlet port for exiting toner from the toner container;

a first shutter positioned at the outlet port, the first shutter is movable between a closed position blocking the outlet port and an open position unblocking the outlet port; and a projection downward from the first shutter that is movable with the first shutter and positioned to contact and push open a second shutter of an inlet port of the developer unit in an insertion direction of the toner container into the image forming device during insertion of the toner container into the image forming device.

14. The toner container of claim 13, wherein the projection is positioned closer to the outlet port when the first shutter is in the closed position than when the first shutter is in the open position.

15. The toner container of claim 13, wherein the first shutter is translatable between the closed position and the open position.

16. A toner container for use with a developer unit of an image forming device, comprising:

an elongated body extending along a longitudinal dimension between a front and a rear of the body, the body having a reservoir for storing toner;

an outlet port on a bottom of the body and adjacent to the front of the body for exiting toner from the reservoir;

a first shutter positioned at the outlet port, the first shutter is translatable along the longitudinal dimension between a closed position blocking the outlet port and an open position unblocking the outlet port, the first shutter having an engagement surface that is positioned to contact and push open a second shutter of an inlet port of the developer unit in a rear-to-front direction of the body during insertion of the toner container into the image forming device; and a biasing member biasing the first shutter in the rear-to-front direction of the body towards the closed position, the biasing member having a biasing force that keeps the first shutter from unblocking the outlet port when the engagement surface of the first shutter receives a reaction force in a front-to-rear direction of the body from contact with the second shutter as the engagement surface pushes open the second shutter in the rear-to-front direction during insertion of the toner container into the image forming device.

17. The toner container of claim 16, wherein the engagement surface projects downward from a bottom surface of the first shutter.

18. The toner container of claim 16, wherein the outlet port is positioned closer to the front of the body than the engagement surface is to the front of the body when the first shutter is in the closed position.

19. A toner container for use in an image forming device, comprising:

an elongated body extending along a longitudinal dimension of the body between a front and a rear of the body, the front of the body leads during insertion of the toner container into the image forming device and the rear of the body trails during insertion of the toner container into the image forming device, the body having a reservoir for storing toner;

an outlet port for exiting toner from the reservoir;

a shutter positioned at the outlet port, the shutter is translatable between a closed position blocking the outlet port and an open position unblocking the outlet port; and an extension protruding from the shutter along the longitudinal dimension towards the front of the body and unobstructed at the front of the body for contacting a corresponding surface in the image forming device during insertion of the toner container into the image forming device and receiving an actuation force from the corresponding surface in the image forming device to move the shutter relative to the body along the longitudinal dimension in a front-to-rear direction of the body from the closed position to the open position during insertion of the toner container into the image forming device.

20. The toner container of claim 19, wherein the extension has a free end that extends farther than the front of the body in a rear-to-front direction of the body when the shutter is in the closed position to contact the corresponding surface in the image forming device.

21. The toner container of claim 19, further comprising a drive coupler on the front of the body for mating with a corresponding drive coupler in the image forming device when the toner container is installed in the image forming device for receiving rotational motion from the corresponding drive coupler in the image forming device, wherein the extension has a free end that extends farther than the drive coupler in a rear-to-front direction of the body when the shutter is in the closed position to contact the corresponding surface in the image forming device.

22. The toner container of claim 19, wherein the shutter of the toner container includes an engagement surface that is positioned to contact and push open a developer shutter of an inlet port of a developer unit in a rear-to-front direction of the body during insertion of the toner container into the image forming device.

23. The toner container of claim 22, wherein the engagement surface projects downward from a bottom surface of the shutter of the toner container.

24. The toner container of claim 22, wherein the outlet port is positioned closer to the front of the body than the engagement surface is to the front of the body when the shutter of the toner container is in the closed position.

* * * * *